Jan. 5, 1960

E. F. HAMPF 2,919,791

CONVEYORS

Filed May 27, 1957

INVENTOR.
Edvin Fritiof Hampf
BY
Pierce Scheffler & Parker
Attorneys

Jan. 5, 1960 E. F. HAMPF 2,919,791
CONVEYORS
Filed May 27, 1957 2 Sheets-Sheet 2

INVENTOR
Edwin Fritiof Hampf
BY Pierce Scheffler & Parker
ATTORNEYS

United States Patent Office 2,919,791
Patented Jan. 5, 1960

2,919,791
CONVEYORS

Edvin Fritiof Hampf, Gothenburg, Sweden, assignor to Aktiebolaget Harbor, Gothenburg, Sweden, a corporation of Sweden Application May 27, 1957, Serial No. 661,948

Claims priority, application Norway November 2, 1956

2 Claims. (Cl. 198—139)

This invention relates to conveyors of the type comprising endless chains or similar members which are connected with carriers or pockets for case-goods to be conveyed. Conveyors of this type may be used for the loading and unloading of ships and usually comprise a horizontal part and a vertical part adapted to hang down into the cargo space of the ship and may further comprise another vertical portion to be placed above a quay, the articles to be conveyed being loaded onto the conveyor or discharged therefrom at the lower end of the last-named vertical portion. Conveyors of this type usually comprise endless chains which are so long that parts of the chains can be introduced into a magazine from which an excess length of chain may be withdrawn to increase the effective length of the conveyor or into which an excess length may be introduced to shorten said effective length.

The object of this invention is to provide a conveyor including means to vary the effective length of the conveyor during operation thereof by varying the speed of drive wheels comprised in the conveyor. This object is obtained by mechanism illustrated in the annexed drawing in which.

Figure 1:
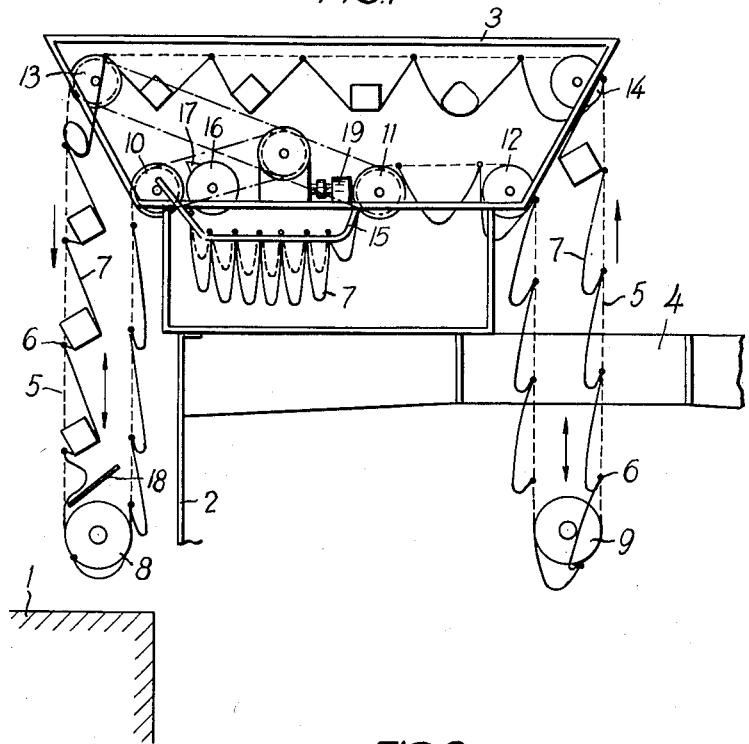
Fig. 1 is a diagrammatic side elevation of a conveyor in operation on the deck of a ship.
Figure 2:
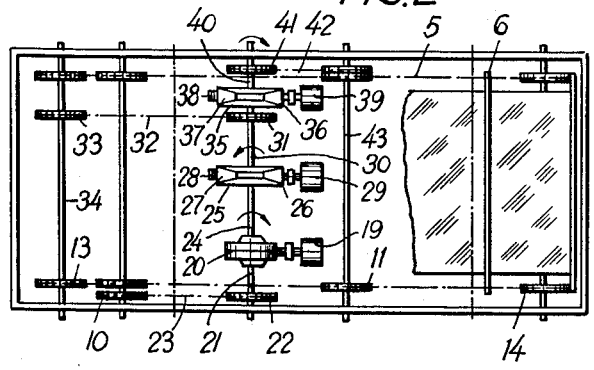
Fig. 2 is a top view of the conveyor.
Figure 3:
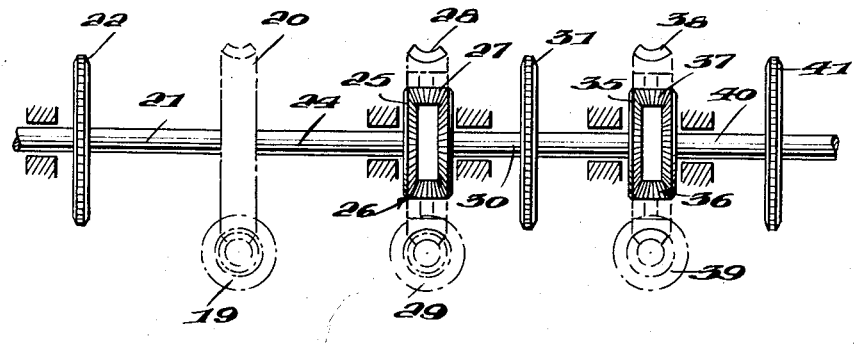
Fig. 3 is a detailed view of the worm and planetary gear transmission.

Referring to Fig. 1, a ship 2 lays moored to a quay 1. On the deck of the ship 2 there is mounted a conveyor frame 3 in a manner such that a vertical part of the endless conveyor hangs down above the quay 1, while another vertical part at the opposite end of the conveyor hangs down through the hatchway 4. The conveyor comprises two parallel endless chains 5 which are interconnected by bars 6. The bars carry pockets 7 preferably consisting of fabric and adapted to hold the articles to be conveyed. At the ends of the suspended parts of the conveyor there are provided turning-wheels 8 and 9 which are loosely supported by the chains. The returning parts of the chains located between the turning-wheels 8 and 9 run over lower drive wheels 10 and auxiliary drive wheels 11 and over lower guide wheels 12. The loaded part of each chain runs over an upper drive wheel 13 and an upper guide wheel 14.

Between the drive wheels 10 and 11 for the lower horizontal return portions of the chains there is provided a magazine for the excess lengths of the chains, said magazine consisting of two parallel rails 15 which are bent upward at their ends. The chains 5 are introduced into the magazine due to the fact that the bars 6 laterally project beyond the pockets 7 and consequently will be caught by the rails 15 and guided along the rails from the drive wheel 10 to the drive wheel 11. Close to the drive wheel 10 is a disk 16 which runs at the same speed as the wheel 10 and has a lug 17 which takes hold of the bars 6 arriving on the rails 15 and moves the bars along part of the rails. In the magazine, the chains 5 are suspended in loose bends from the bars 6. As a result thereof, a great length of chains can be accumulated in a short magazine. At the turning-wheel 8 above the quay there is provided an emptying device consisting of a slanting plate or similar member 18 which ensures unloading of the articles from the pockets 7.

The conveyor has a main drive motor 19 which by means of a worm gear 20 drives a shaft 21 having mounted thereon a wheel 22 which by means of a chain 23 is connected with the drive wheel 10 for the return part of the chain 5. A second output shaft 24 of the worm gear 20 is connected with a sun wheel 25 of a first planetary gear 26 the planetary wheels 27 of which are connected to a gear rim 28 in engagement with a pinion mounted on the shaft of a reversible auxiliary motor 29. The output shaft 30 of the planetary gear 26 has mounted thereon a drive wheel 31 which by means of a chain 32 or similar member is connected with a wheel 33 mounted on the common shaft 34 of the drive wheels 13. The shaft 30 has further mounted thereon a sun wheel 35 of a second planetary gear 36 the planetary wheels 37 of which are connected with a gear rim 38 in engagement with a pinion on the shaft of a second reversible auxiliary motor 39. The output shaft 40 of the planetary gear 36 carries a wheel 41 which by means of a chain 42 or similar member drives the shaft 43 of the drive wheels 11 located at the outlet end of the magazine. All of the chain transmissions 22, 10; 31, 33 and 41, 11 have the same ratio of gear.

The mode of operation is as follows.

In normal operation, that is, when the effective length of the conveyor need not be varied, the main motor 19 only is running, whereas the motors 29 and 39 are at a standstill. In this case, the wheels 10, 11 and 13 are rotating at equal speeds. Consequently, when one pocket enters the magazine via the wheel 10 one pocket simultaneously leaves the magazine via the wheel 11. The turning-wheels 8 and 9 are located at constant distances from the horizontal part of the conveyor irrespective of the loading conditions.

If as a result of the unloading the ship becomes lighter and the turning-wheel 8 consequently has to be lowered, the auxiliary motor 29 is started in a direction such that the planetary wheels 27 of the gear 26 increase the speed of the output shaft 30 as compared with the speed of the input shaft 24. In other words, the pinion on motor shaft 29 drives the gear rim 28 in a direction to cause the planetary wheels 27 connected thereto to drive the output shaft 30 at a greater speed than would normally result from operation with the motor 29 in the de-energized state. As a result thereof, the speed of the drive wheels 11 and 13 will be increased correspondingly, whereas the wheels 10 rotate at a constant lower speed. Consequently, the turning-wheel 8 will be lowered. If instead the wheel 8 is to be lifted, the direction of rotation of the motor 29 is reversed with the result that the wheels 11 and 13 will rotate slower than the wheel 10.

If it is desired to alter the level of the turning-wheel 9 and to maintain the turning-wheel 8 in its position, the motor 39 is started in either direction resulting in that the drive wheels 10 and 13 will continue to rotate at constant speed, whereas the speed of the wheels 11 will be increased or decreased. If said last-named speed is increased, the discharge velocity of the chains leaving the magazine will be higher than the velocity at which they enter the magazine, whereby the turning-wheel will be lowered, whereas a reduction of said speed prevents the chains from leaving the magazine at the same velocity as they enter via the wheel 10, whereby the turning-wheel will be lifted.

The invention may also be applied to conveyors of the type comprising a single vertical part. In this case, the planetary gear 26 and the drive wheels 13 are omitted, and the level of the turning-wheel 9 is varied by means of the motor 39 as described above.

Due to the arrangement of the drive system described, all adjusting movements can be carried out without interruption of the operation of the conveyor and by means of a very simple drive system which permits positive control of the chains without the use of brakes and clutches.

What I claim is:

1. A variable length conveyor for loading and unloading apparatus comprising a frame having upper and lower guide wheels and upper and lower drive wheels, an endless conveyor mounted on said guide wheels and said drive wheels, said conveyor having a substantially horizontal upper portion and a substantially horizontal lower portion connected at their ends by a depending loading loop at the loading end of the frame and a depending unloading loop at the unloading end of the frame, magazine means in the lower portion of said frame intermediate said lower drive wheels and said lower guide wheels for accumulating quantities of the lower horizontal portion of the conveyor, auxiliary drive wheels connected to the frame intermediate said magazine and said lower guide wheels, and means for driving said three sets of drive wheels comprising a first shaft connected to a first set of drive wheels, a main drive motor driving said shaft at a constant speed, first variable transmission gearing means having an output shaft, said first shaft constituting the input shaft of said first variable transmission gearing means, means connected to the output shaft of said first variable transmission gearing for driving a second set of said driving wheels, second variable transmission gearing means having an output shaft, the output shaft of said first variable transmission means constituting the input shaft of said second variable transmission gearing means, means connected to the output shaft of said second variable transmission gearing means for driving a third set of said driving wheels, means for adjusting said first variable transmission gearing means to cause the output shaft thereof to rotate at a different speed from the input shaft thereof, and means for adjusting said second variable transmission gearing means to cause the output shaft thereof to rotate at a different speed from the input shaft thereof, whereby the speeds of rotation of said second and third sets of drive wheels may be varied independently with respect to the speed of rotation of said first set of drive wheels.

2. In combination with a variable length conveyor for loading and unloading apparatus comprising a frame having upper and lower guide wheels at the loading end thereof and upper and lower driving wheels at the unloading end thereof, a pair of endless chains mounted on said guide wheels and said drive wheels, each of said chains having substantially horizontal upper portions and substantially horizontal lower portions connected at their ends by a depending loading loop at the loading end of the frame and a depending unloading loop at the unloading end of the frame, transverse rods mutually connecting said chains, load supporting means supported by said rods, magazine means in the lower portion of said frame intermediate said lower drive wheels and said lower guide wheels for accumulating quantities of the lower horizontal portions of said chains, and auxiliary drive wheels connected to the frame intermediate said magazine and said lower guide wheels and supportingly engaging the lower horizontal portions of said chains; means for driving said drive wheels comprising a first shaft connected to said lower drive wheels, a main drive motor driving said shaft at a constant speed, first variable transmission gearing means comprising a first sun gear connected to said first shaft, a second sun gear having an output shaft, and planetary gears mounted on a gear rim and cooperating with said first and second sun gears, means connected to the output shaft of said first variable transmission gearing means for driving said upper drive wheels, second variable transmission gearing means having a sun gear connected to the output shaft of said first variable transmission gearing means, a second sun gear having an output shaft, and planetary gears mounted on a gear rim and cooperating with said sun gears, means connected to the output shaft of said second variable transmission gearing means for driving said auxiliary drive wheels, means for driving the gear rim of said first variable transmission gearing means to vary the speed of rotation of the output shaft thereof relative to the speed of said first shaft, and means for driving the gear rim of said second variable transmission gearing means to vary the speed of rotation of the output shaft thereof relative to the speed of rotation of the output shaft of said first variable transmission gearing means, whereby the speeds of rotation of said upper drive wheels and said auxiliary drive wheels may be varied independently with respect to the speed of rotation of said lower drive wheels.

References Cited in the file of this patent

UNITED STATES PATENTS

| 1,112,440 | Donald | Oct. 6, 1914 |
| 2,762,492 | Hopkins | Sept. 11, 1956 |